United States Patent Office 3,770,702
Patented Nov. 6, 1973

3,770,702
COATING COMPOSITION
Robert Roper, Summit, and Charles A. Rowe, Jr., Westfield, N.J., assignors to Esso Research and Engineering Company
No Drawing. Continuation of application Ser. No. 2,929, Jan. 14, 1970. This application Dec. 9, 1970, Ser. No. 206,559
Int. Cl. C08f 29/50
U.S. Cl. 260—73 R          11 Claims

ABSTRACT OF THE DISCLOSURE

A novel solventless coating composition is prepared characterized by its ready air-dryability to a tough, hard finish. The coating composition contains certain esters of di- or polyhydroxy alcohols and α,β-olefinically unsaturated carboxylic acids together with a polyfunctional aldehyde having less than all of its aldehyde groups acetalized.

---

This invention relates to novel coating compositions. More specifically, it relates to coating compositions which may be used in solventless formulations.

SUMMARY OF THE INVENTION

In accordance with certain of its aspects, the novel coating composition of this invention may comprise:

(a) an ester of an α,β-olefinically unsaturated carboxylic acid containing at least two α,β-olefinically unsaturated carboxylic acid moieties selected from the group consisting of:
  (i) esters of α,β-olefinically unsaturated monocarboxylic acids with polyhydroxy alcohols; and
  (ii) polymeric esters of α,β-olefinically unsaturated dicarboxylic acids with dihydroxy alcohols; and
(b) a polyfunctional aldehyde having less than all of its aldehyde groups acetalized with β,γ-olefinically unsaturated alcohol.

DESCRIPTION OF THE INVENTION

The novel coating composition of this invention may contain as a first component an ester of an α,β-olefinically unsaturated carboxylic acid containing at least two α,β-olefinically unsaturated carboxylic acid moieties selected from the group consisting of esters of α,β-olefinically unsaturated monocarboxylic acids with polyhydroxy alcohols and polymeric esters of α,β-olefinically unsaturated dicarboxylic acids with dihydroxy alcohols.

The α,β-olefinically unsaturated monocarboxylic acids, which may form the esters used in the first component, may typically include acids as set forth in Table I:

TABLE I

| | |
|---|---|
| Acrylic acid | Crotonic acid |
| Methacrylic acid | Cinnamic acid |
| Ethacrylic acid | α-Phenylacrylic acid |

The polyhydroxy alcohols which may form the esters used in the first component may typically include glycols, triols, or other polyols including those set forth in Table II:

TABLE II

| | |
|---|---|
| Ethylene glycol | Xylylene glycol |
| 1,2-propylene glycol | 1,4-dimethylol cyclohexane |
| 1,3-butylene glycol | Sorbitol |
| Neopentyl glycol | Diethylene glycol |
| Trimethylol propane | Triethylene glycol |
| Trimethylol ethane | Glycerol |
| Pentaerythritol | |

The preferred esters of α,β-olefinically unsaturated monocarboxylic acids and polyhydroxy alcohols containing at least two α,β-olefinically unsaturated carboxylic acid moieties which may be employed as the first component may typically have the formula:

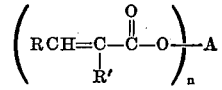

wherein R and R' may be hydrogen or a hydrocarbon moiety, preferably alkyl, e.g. methyl; $n$ may be 2–6; and A may be an organic residue derived from a polyhydroxy alcohol. These esters may be esters of acrylic (including methacrylic) acid with polyhydroxy alcohols derived from polyepoxides, epoxy esters, polyesters, hydroxy-terminated polyethers, aliphatic polyols, etc.

The esters of α,β-olefinically unsaturated monocarboxylic acids and polyhydroxy alcohols may be prepared by reacting the acid and the alcohol; alternatively they may be made by reacting acid derivatives, e.g., acid chloride or acid anhydride or other acid esters (e.g. as by transesterification) with the appropriate alcohols. They may also be made by other procedures, for example, by the reaction of an epoxide with an acid or by the reaction of a glycidyl acrylate with a polybasic acid.

The esters of α,β-olefinically unsaturated monocarboxylic acids and polyhydroxy alcohols (which may be formed by various techniques including reaction of the acids of Table I with the polyhydroxy alcohols of Table II) may typically include esters as set forth in Table III:

TABLE III

Ethylene glycol dimethacrylate
1,2-Propylene glycol diacrylate
Pentaerythritol tetraethacrylate
Pentaerythritol tetramethacrylate
Trimethylolpropane triacrylate
Trimethylolpropane diacrylate
Trimethylolpropane dimethacrylate
Tris(3-acryloxy-2-hydroxy-propyl) trimellitate
Trimethylolpropane trimethacrylate
The reaction product of 1 mole of 1,2-propylene glycol diadipate and 2 moles of glycidyl acrylate
The reaction product of 2 moles of adipic acid, 3 moles 1,2-propylene glycol, and 2 moles of acrylic acid [1]

[1] Prepared by mixing the components and heating until the stoichiometric amount of water is driven off.

Bis(3-acryloxy-2-hydroxyl propyl) adipate
Tetraethylene glycol dimethacrylate
The reaction product of 1 mole of diethylene glycol bis (trimellitate) with 4 moles of glycidyl acrylate The polymeric esters of α,β-olefinically unsaturated dicarboxylic acids and dihydroxyl alcohols may typically be formed from the α,β-olefinically unsaturated dicarboxylic acids (including anhydrides) of Table IV:

TABLE IV

| | |
|---|---|
| Maleic acid | Itaconic acid |
| Maleic anhydride | Citraconic acid |
| Fumaric acid | Citraconic anhydride |

The polymeric esters may typically be formed from the dihydroxy alcohols of Table V:

TABLE V

| | |
|---|---|
| Ethylene glycol | Diethylene glycol |
| 1,2-propylene glycol | Triethylene glycol |
| 1,3-butylene glycol | 1,4-dimethylol cyclohexane |
| Neopentyl glycol | |

The polymeric ester of the α,β-olefinically unsaturated dicarboxylic acid may also include moieties derived from a saturated aliphatic or an aromatic dicarboxylic acid, e.g. adipic acid, sebacic acid, phthalic acid, etc.

The preferred polymeric esters of α,β-olefinically unsaturated dicarboxylic acids with dihydric alcohols, which may be employed as the first component, may typically have the following formula:

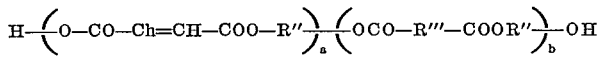

wherein R" may be bivalent aliphatic or alicyclic group, optionally containing a carboxyl group, e.g.

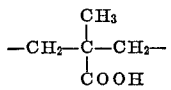

R''' may be a bivalent aliphatic, alicyclic, or aromatic hydrocarbon moiety, $a$ may be 4–25 and $b$ may be 0–25, preferably 4 to 25.

The polymeric esters of α,β-olefinically unsaturated dicarboxylic acids with dihydroxy alcohols, which may be used as the first component of the composition of this invention, may typically included those set forth in Table VI:

TABLE VI

Polyethylene maleate
Polypropylene fumarate
Polyethylene fumarate
Poly(triethylene glycol-itaconic acid)
Poly(diethylene glycol-fumaric acid)

The preferred ester of α,β-olefinically unsaturated carboxylic acid, which may be used as the first component of the coating composition, may include:

(a) Trimethylol propane trimethacrylate;
(b) Trimethylol propane triacrylate;
(c) The reaction product of 2 moles of methacrylic acid with 1 mole of 2,2'-bis(4-hydroxyphenyl) propane diglycidyl ether having the formula:

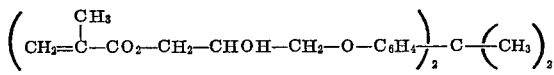

(d) Tetraethylene glycol dimethacrylate;
(e) The reaction product of 5 moles of fumaric acid, 3 moles of adipic acid, 7 moles of neopentyl glycol, and 1 mole of α,α-dimethylol propionic acid yielding a polymeric ester having a molecular weight of 1900.

The second component of the coating composition of this invention may include a polyfunctional aldehyde having less than all of its aldehyde groups acetalized with a β,γ-olefinically unsaturated alcohol. The aldehyde may be a di-aldehyde or a trialdehyde. Typical aldehydes may include:

TABLE VII

Cyclohexane 1,4-dicarboxaldehyde
Cyclohexane 1,3-dicarboxaldehyde
β-(4-formylcyclohexyl) propionaldehyde
Glutaraldehyde
Adipaldehyde
Glyoxal
Tricyclo[5.2.1.0$^{2,6}$] decane 3,8-dicarboxaldehyde, i.e. tetrahydrodicyclopentadiene 3,8-dicarboxaldehyde
Isophthalaldehyde
β-(3-formyl-4-methylcyclohexyl) butyraldehyde
Cyclododecane tricarboxaldehyde
eMthyl norbornene dicarboxaldehyde The β,γ-olefinically unsaturated alcohol, preferably an allyl alcohol (including methallyl alcohol), with may be employed in the formation of the second component of the coating composition, may typically include the following:

TABLE VIII

| Allyl alcohol | 2-penten-1-ol |
|---|---|
| Methallyl alcohol | 2-ethyl allyl alcohol |
| 2-buten-1-ol | |

Compositions which may be used as the second component of the composition of this invention may typically be represented by the following formula:

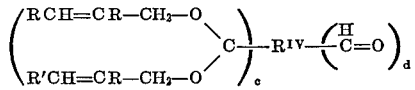

wherein R and R' may have the same meaning as supra, and R$^{IV}$ may be a polyvalent hydrocarbon (e.g. aliphatic, aromatic, cycloaliphatic) moiety, $c$ is 0–3, $d$ is 1–4, and $c+d$ is equal to or greater than 2.

Typical second component polyfunctional aldehydes having less than all of their aldehyde groups acetalized with β,γ-olefinically unsaturated alcohol may include those set forth in Table IX:

TABLE IX

Cyclohexane 1,4-dicarboxaldehyde
β-(4-formylcyclohexyl) propionaldehyde
Cyclohexane dicarboxaldehyde diallyl monoacetal i.e.

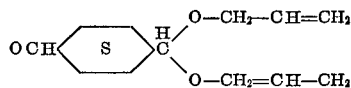

Cyclododecane tricarboxaldehyde tetraallyl diacetal
Isophthalaldehyde

Formation of the novel coating compositions of this invention may be effected by mixing 20–95 parts, typically 50–85 parts, say 65 parts of first component and 5–80 parts, typically 15–50 parts, say 35 parts of second component. Mixing may be effected at 15° C. to 35° C., say 20° C. for 1–20 minutes, typically 10 minutes. Typically the liquid first and second components may readily intermix to form a homogeneous system in the absence of added solvent.

If desired, solvent, preferably hydrocarbons (such as xylene, toluene, etc.), ketones, esters, etc., may be added in amount of 50–100 parts. It is, however, an outstanding and unexpected feature of the coating compositions of this invention that they may be and preferably are formed and used without addition of solvents.

The product coatings may optionally and preferably contain:

(a) stabilizers such as benzoquinone, hydroquinone, dimethyl hydroquinone, oximes such as butyraldoxime, acetaldoxime, etc., phenols such as 2,6-ditert-butyl-4-methylphenol, etc. to insure maximum storage stability; and (b) driers such as cobalt naphthenate, cobalt octanoate, cobalt neodecanoate, etc. to promote air drying, etc.

The solventless product coating compositions may be particularly characterized by:

(a) rapid rate of air drying—typically 17–300 minutes in ambient air, which is outstanding for a solventless coating;
(b) formation of tack-free films;
(c) formation of tough films;
(d) ease of curing of thick (i.e. 3 mil or greater) film;
(e) ready application in the absence of solvent; and
(f) ability to be formulated and used as a one-packaged system.

It is unexpected that all of these features can be attained to such a high degree in a solventless coating.

The novel coating compositions of this invention may contain, as a third component, a β,γ-olefinically unsaturated alkoxy compound selected from the group consisting of:

(a) a full acetal of a polyfunctional aldehyde and β,γ-olefinically unsaturated alcohol; and
(b) an ether of a polyhydroxy alcohol and a β,γ-olefinically unsaturated alcohol.

The polyfunctional aldehydes which may be used in the third component of the product of this invention may be those set forth in Table IX; and the $\beta,\gamma$-olefinically unsaturated alcohols may be typified by those set forth in Table VIII. The full acetals used may typically be those set forth in Table X:

TABLE X 1,1,3,3-tetraallyloxy propane
Diallyl formal
2,2-diallyloxypropane
1,4-cyclohexanedicarboxaldehyde tetraallylacetal The ethers of polyhydroxy alcohols and $\beta,\gamma$-olefinically unsaturated alcohols may typically be formed from the polyhydroxy alcohols typically as set forth in Table II. The $\beta,\gamma$-olefinically unsaturated alcohols which may be employed may be those set forth in Table VIII. Typical ethers may be those set forth in Table XI.

TABLE XI

Trimethylolpropane diallyl ether
Pentaerythritol diallyl ether
Ethylene glycol dimethallyl ether Preferably, the $\beta,\gamma$-olefinically unsaturated alkoxy compound may be present in amount of 0–50 parts, typically 0–30 parts, say 15 parts.

It is a feature of the novel coating composition of this invention that it may readily be blended with reactive diluents including vinyl monomers such as styrene, divinyl benzene, ethyl acrylate, methyl methacrylate, allyl acrylate, acrylonitrile, vinyl acetate, etc.

Practice of this invention may be observed from inspection of the following examples, wherein all parts are parts by weight unless otherwise stated.

In the following examples, the components employed were as follows:

FIRST COMPONENTS (1) TMPTM—trimethylolpropane trimethacrylate [2]
(2) TMPTA—trimethylolpropane triacrylate [2]
(3) EPDM—epoxydimethacrylate [3]
(4) TEGDM—tetraethylene glycol dimethacrylate [2]

[2] Containing 100 p.p.m. hydroquinone.
[3] Made by reacting 2 moles of methacrylic acid and 1 mole of diglycidyl ether of 2,2'-bis(4-hydroxyphenyl) propane.

SECOND COMPONENTS (1) CHDDA—cyclohexanedicarboxaldehyde mono(diallylacetal)
(2) FCP—$\beta$-(4-formylcyclohexyl) propionaldehyde
(3) IPA—isophthalaldehyde

THIRD COMPONENTS (1) TAP—1,1,3,3-tetra allyloxy propane
(2) TMPDE—trimethylolpropane diallyl ether

Example 1

In this example, which represents practice of a preferred embodiment of this invention, a coating composition may be prepared from 10.0 parts of trimethylolpropane trimethacrylate (containing 100 p.p.m. hydroquinone as stabilizer), as first component; 5.0 parts of cyclohexane dicarboxaldehyde diallyl monoacetal as second component; and 0.06% cobalt metal (based upon total weight of ingredients from a 6% solution of cobalt octoate). The components may be homogeneously blended and applied to a flat surface to yield a 3 mil wet film which may be allowed to dry at ambient conditions of 73° F.±2° F. and 40%–55% relative humidity. A tough, glossy, tack-free film may be observed after 3.5 hours having (after aging for 3 days) a pencil hardness of 3H–4H.

In each of the following examples carried out in accordance with this invention, the procedure of Example 1 was followed using the noted first, second, and third (when used) components. In Examples 2–7 and 12, the cobalt concentration was 0.12%. The time to yield a tack-free film and the pencil hardness was noted. All films were found to be tough.

TABLE XII

| | Components (parts) | | | | | | | | | |
|---|---|---|---|---|---|---|---|---|---|---|
| | First | | | | Second | | | Third | | |
| Ex. | 1 | 2 | 3 | 4 | 1 | 2 | 3 | 1 | 2 | Time | Hardness |
| 1 | 10 | | | | 5 | | | | | 3.5 hours | 3H–4H |
| 2 | 10 | | | | | 4 | | | | 17 minutes | 2H–3H |
| 3 | 10 | | | | 1 | | 4 | | | 21 hours | 2H–3H |
| 4 | 10 | | | | 3 | | 2 | | | 75 minutes | 6H–7H |
| 5 | 10 | | | | 3 | | | | 2 | 90 minutes | 3H–4H |
| 6 | 10 | | | | | 2 | | 3 | | 24 hours | 2H–3H |
| 7[1] | 5 | | | | | 4 | | | | 17 hours | F–H |
| 8 | | 10 | | | 5 | | | | | 3.5 hours | 6H–7H |
| 9 | | 10 | | | 8 | | | | | 2 hours | HB–F |
| 10 | | | 10 | | 5 | | | | | 2.25 hours | F–H |
| 11 | | | | 10 | 5 | | | | | 21 hours | 2H–3H |
| 12 | 5 | | 5 | | | 2 | 4 | | | 23 hours | 3H–4H |

[1] Also containing 5 parts butyl acrylate (containing 5 p.p.m. p-methoxyphenol).

From the above Table XII, it will be apparent that films having satisfactory hardness may be readily obtained by practice of this invention; and it may be advantageously possible to vary the time to tack-free from 17 minutes to 23 hours. Compositions having low tack-free time, such as that of Example 2, may be used when a very fast drying coating is desired while those having longer tack-free time, such as that of Example 12, may be employed when a slow drying coating is desired or when it is possible to dry the coating by baking.

Example 13

In this example, which represents practice of a preferred embodiment of this invention, a fumarate polyester may be prepared from 1.25 moles of fumaric acid, 0.75 moles of adipic acid, 1.75 moles of neopentyl glycol, and 0.25 mole of $\alpha,\alpha$-dimethylolpropionic acid, the product having a number average molecular weight ($\overline{M}_n$) of 1900 and an average of three olefinically unsaturated groups per molecule. The reaction was carried out under nitrogen to 200° C. and held at 200° C. until an acid number of 71.2 was attained. Water of condensation was continuously removed. A coating composition may be prepared from 10.0 parts of this polyester as first component; 5.0 parts of CHDDA as second component; and 0.12 part cobalt metal (based upon total weight of ingredients from a 6% solution of cobalt octoate). The components may be homogeneously blended and applied to a flat surface to yield a 3 mil wet film which may be allowed to dry at ambient conditions of 73°±2° F. and 40%–55% relative humidity. A tough, glossy, tack-free film may be observed after 60 minutes having (after aging for 3 days) a pencil hardness of 3B–2B.

Example 14

In this example, which represents practice of a preferred embodiment of this invention, a coating composition may be prepared from 10.0 parts of TMPTM as first component; 4.0 parts of glutaraldehyde as second component; and 0.12% cobalt metal (based upon total weight of ingredients from a 6% aqueous solution of cobalt octoate). The components may be homogeneously blended and applied to a flat surface to yield a 3 mil wet film which may be allowed to dry at ambient conditions of 73° F.±2° F. and 40%–55% relative humidity. A tough, glossy, tack-free film may be observed after 19 hours.

Example 15

In this example which represents a control experiment, a coating composition may be prepared from 10.0 parts of TMPTM as first component; no second component; 5 parts of TMPDE as third component; and 0.06% cobalt metal (based upon total weight of ingredients from a 6% solution of cobalt octoate). The components may be homogeneously blended and applied to a flat surface to yield a 3 mil wet film which may be allowed to dry at ambient conditions of 73° F.±2° F. and 40% to 55% relative humidity. After 48 hours, this film was observed to be still liquid and thus unsatisfactory.

Example 16

In this example which represents a control experiment, a coating composition may be prepared from 10.0 parts of TMPTM as first component; no second component; 5.0 parts of TAP as third component and 0.06% cobalt metal (based upon total weight of ingredients from a 6% solution of cobalt octoate). The components may be homogeneously blended and applied to a flat surface to yield a 3 mil wet film which may be allowed to dry at ambient conditions of 73° F.±2° F. and 40%–55% relative humidity. After 48 hours, the film was still liquid and thus unsatisfactory.

Example 17

In this example which represents a control experiment, a coating composition may be prepared from 10.0 parts of TMPTM as first component; no second component; and 0.06% cobalt metal (based upon total ingredients from a 6% solution of cobalt octoate). The components may be homogeneously blended and applied to a flat surface to yield a 3 mil wet film which may be allowed to dry at ambient conditions of 73° F.±2° F. and 40%–55% relative humidity. After 48 hours, this film was observed to be still liquid and thus unsatisfactory.

By comparison of unsatisfactory control Examples 15–17 with Examples 1–14, it will be apparent that the novel products of this invention may be obtained by following the procedures set forth herein as in Examples 1–14, while the procedures of control Examples 15–17 do not permit attainment of satisfactory results.

It is a particular feature of the novel combinations of this invention that they may readily air dry in contrast to films containing only the first component which, when used without second component, will not readily dry on exposure to air. In fact, presence of air will inhibit air drying of the first component alone, even when the first component is catalyzed by catalysts such as benzoyl peroxide, methyl ethyl ketone peroxide, etc.

Example 18

In this example which represents practice of a preferred embodiment of this invention, a coating composition may be prepared from 10.0 parts of EPDM as first component; 2.0 parts of FCP as second component; and 0.12% cobalt metal (based upon total ingredients from a 6% solution of cobalt octoate). The components may be homogeneously blended and applied to a flat surface to yield a 3 mil wet film which may be allowed to dry at ambient conditions of 73° F. ±2° F. and 40%–55% relative humidity. A tough, glossy, clear, hard, tack-free film may be observed after 3.25 hours having (after aging for 3 days) a pencil hardness of 2H–3H.

Example 19

In this example which represents practice of a preferred embodiment of this invention, the first component may be prepared by reacting 256 parts of glycidyl acrylate (containing 200 p.p.m. p-methoxy phenol) with 146 parts of adipic acid in the presence of 1.75 parts of triethylamine and 0.4 parts of methyl p-benzoquinone. The mixture was heated with agitation to 100° C. and held there for 3.5 hours at which point an acid number of 5.8 was noted. The product bis(3-acryloxy-2-hydroxypropyl) adipate had a molecular weight of 625.

10 parts of this product as first component may be mixed with 3 parts of FCP and 0.12% cobalt to yield a flexible film which is tack-free in 2 hours. The film passed a conical mandrel bend of 0.27 inches and had a pencil hardness of 2B–B.

Example 20

In this example which represents practice of a preferred embodiment of this invention, the first component may be prepared by reacting 256 parts of glycidyl acrylate (containing 200 p.p.m. p-methoxy phenol) with 188 parts of azelaic acid in the presence of 3.5 parts of triethylamine and 0.22 parts of methyl p-benzoquinone. The mixture was heated with agitation to 95° C. and held there for 4.3 hours at which point an acid number of 11.3 was obtained. The product bis(3-acryloxy-2-hydroxypropyl) azelate had a molecular weight of 630.

10 parts of this product as first component may be mixed with 2 parts of FCP and 0.12% cobalt to yield a product film which is tack-free in 1.75 hours. The film had a flexibility of 0.30 inches (conical mandrel bend test) and a pencil hardness of 1B–2B.

Example 21

7 parts of the first component of Example 20 may be mixed with 3 parts of EPDM and this combined with 2 parts of FCP second component. 0.12% cobalt was added and the mixture found to be tack-free after 3.0 hours. The film had a flexibility of less than 0.125 inches (conical mandrel bend test) and a pencil hardness of 1B–HB.

Pencil hardness of the above products may be determined by the procedure of W. T. Smith as set forth in the article in the Official Digest of the Federation of Paint and Varnish Production Clubs—vol. 28, No. 374, p. 232 (1956).

Although this invention has been illustrated by reference to specific embodiments, it will be apparent to those skilled in the art that various changes and modifications may be made which clearly fall within the scope of this invention.

What is claimed is:
1. A coating composition comprising:
   (a) from about 20 to about 95 parts, per one hundred parts of coating composition, of an ester of an α,β-olefinically unsaturated carboxylic acid containing at least two α,β-olefinically unsaturated carboxylic acid moieties selected from the group consisting of:
      (i) esters of acrylic acid with a polyhydroxy alcohol, selected from the group consisting of hydroxy-terminated polyethers and aliphaticpolyols;
      (ii) esters of methacrylic acid with a polyhydroxy alcohol selected from the group consisting of hydroxy-terminated polyethers and aliphatic polyols; and
   (b) from about 80 to about 5 parts, per 100 parts of coating composition, of a polyfunctional aldehyde selected from the group consisting of cyclohexane 1,4-dicarboxaldehyde, cyclohexane 1,3-dicarboxaldehyde, β-(4-formyl cyclohexyl)propionaldehyde, glutaraldehyde, adipaldehyde, and isophahaldehyde, haivng less than all of its aldehyde groups acetalized with a β,γ-olefinically unsaturated alcohol selected from the group consisting of allyl alcohol, methallyl alcohol and 2-ethyl allyl alcohol.

2. A coating composition as claimed in claim 1, wherein said ester of an α,β-olefinically unsaturated carboxylic acid is ethylene glycol dimethacrylate.

3. A coating composition as claimed in claim 1, wherein said ester of an α,β-olefinically unsaturated carboxylic acid is 1,2-propylene glycol diacrylate.

4. A coating composition as claimed in claim 1, wherein said ester of an α,β-olefinically unsaturated carboxylic acid is trimethylolpropane triacrylate, combined with β-(4-formyl cyclohexyl)propionaldehyde.

5. A coating composition as claimed in claim 1, wherein said ester of an α,β-olefinically unsaturated carboxylic acid is epoxydimethacrylate.

6. A coating composition as claimed in claim 1, wherein said second component is cyclohexane dicarboxaldehyde diallyl monoacetal.

7. A coating composition as claimed in claim 1, wherein said second component is β-(4-formyl cyclohexyl)propionaldehyde.

8. A coating composition as claimed in claim 1, wherein including as a third component, up to 50 parts per one hundred parts of coating composition, of a β,γ-olefinically unsaturated alkoxy compound selected from the group consisting of 1,1,3,3-tetraallyloxypropane; diallyl formal; 2,2-diallyloxypropane; 1,4-cyclohexanedicarboxaldehyde tetraallyl acetal; trimethylolpropane diallyl ether; pentaerythritol diallyl ether; and ethylene glycol dimethallyl ether.

9. A coating composition as claimed in claim 8, wherein said third component is 1,1,3,3-tetraallyloxypropane.

10. A coating composition comprising from about 20 to about 95 parts, per one hundred parts of coating composiiton, of trimethylol propane trimethacrylate as a first component and from about 80 to about 5 parts, per one hundred parts coating composition, of cyclohexane dicarboxaldehyde diallyl monoacetal as a second component.

11. A coating composition comprising:
(a) from about 20 to about 95 parts, per one hundred parts of coating composition, of the reaction product of 2 moles of methacrylic acid with 1 mole of 2,2'-bis-(4-hydroxyphenyl)propane diglycidyl ether having the formula:

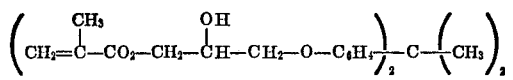

and (b) from about 80 to about 5 parts, per 100 parts of coating composition, of a polyfunctional aldehyde selected from the group consisting of cyclohexane 1,4-dicarboxaldehyde, cyclohexane 1,3-dicarboxaldehyde, β-(4 - formyl cyclohexyl)propionaldehyde, glutaraldehyde, adipaldehyde, and isophahaldehyde, having less than all of its aldehyde groups acetalized with a β,γ-olefinically unsaturated alcohol selected from the group consisting of allyl alcohol, methallyl alcohol and 2-ethyl allyl alcohol.

References Cited
UNITED STATES PATENTS

| | | | |
|---|---|---|---|
| 3,210,441 | 10/1965 | Dowling et al. | 260—867 |
| 3,245,927 | 4/1966 | Ikeda | 260—73 R X |
| 3,441,632 | 4/1969 | Tanaka et al. | 260—73 R X |
| 3,449,277 | 6/1969 | Smith et al. | 260—73 R X |
| 3,454,532 | 7/1969 | Driscoll | 260—73 R |

WILLIAM H. SHORT, Primary Examiner

L. M. PHYNES, Assistant Examiner

U.S. Cl. X.R.

260—33.6 UA, 835, 861, 45.75 R, 45.95, 47 UA, 75 A, 78.5 BB